(12) United States Patent
Tetsuka et al.

(10) Patent No.: US 10,540,754 B2
(45) Date of Patent: Jan. 21, 2020

(54) IMAGE-PROCESSING DEVICE, IMAGE-PROCESSING METHOD, AND MICROSCOPE

(71) Applicant: OLYMPUS CORPORATION, Tokyo (JP)

(72) Inventors: Hisanori Tetsuka, Tokyo (JP); Hiroshi Sakai, Kanagawa (JP); Masayuki Nakatsuka, Tokyo (JP); Shigeto Kaminaga, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 176 days.

(21) Appl. No.: 15/801,683

(22) Filed: Nov. 2, 2017

(65) Prior Publication Data

US 2018/0144443 A1 May 24, 2018

Related U.S. Application Data

(63) Continuation of application No. PCT/JP2015/068735, filed on Jun. 29, 2015.

(51) Int. Cl.
*G06K 9/40* (2006.01)
*G06T 5/00* (2006.01)
(Continued)

(52) U.S. Cl.
CPC ............ *G06T 5/002* (2013.01); *G06K 9/4609* (2013.01); *G06T 5/50* (2013.01); *H04N 5/243* (2013.01);
(Continued)

(58) Field of Classification Search
None
See application file for complete search history.

(56) References Cited

U.S. PATENT DOCUMENTS

2007/0247554 A1 10/2007 Okumichi et al.
2009/0317016 A1 12/2009 Cho et al.
(Continued)

FOREIGN PATENT DOCUMENTS

JP 3611773 B2 1/2005
JP 2007288595 A 11/2007
(Continued)

OTHER PUBLICATIONS

International Search Report dated Sep. 1, 2015 issued in PCT/JP2015/068735.

*Primary Examiner* — Sean M Conner
(74) *Attorney, Agent, or Firm* — Scully, Scott, Murphy & Presser, P.C.

(57) ABSTRACT

An image-processing device is provided with: a pattern-matching portion that performs pattern matching between a first image and a second image acquired before the first image and that outputs a motion vector between the images and an evaluation value that indicates the accuracy of the motion vector; a recursive noise-reduction portion that outputs a noise reduction image, which is the first image to which noise reduction has been applied, and that performs noise reduction in which an image based on the first image and an image based on the noise reduction image formed in the past are mixed in accordance with a predetermined recursion amount; and a controlling portion that controls a recursion amount in the recursive noise-reduction portion on the basis of the motion vector and the evaluation value output by the pattern-matching portion and a gain that is applied to the first image to adjust a brightness thereof.

17 Claims, 13 Drawing Sheets

(51) Int. Cl.
*G06K 9/46* (2006.01)
*G06T 5/50* (2006.01)
*H04N 5/243* (2006.01)

(52) U.S. Cl.
CPC ............... *G06T 2207/10056* (2013.01); *G06T 2207/10064* (2013.01); *G06T 2207/20221* (2013.01)

(56) References Cited

U.S. PATENT DOCUMENTS

2012/0212663 A1 8/2012 Takita
2013/0314557 A1* 11/2013 Furukawa .............. H04N 5/225
 348/208.1

FOREIGN PATENT DOCUMENTS

| | | |
|---|---|---|
| JP | 2008252760 A | 10/2008 |
| JP | 2012175385 A | 9/2012 |
| JP | 2013255132 A | 12/2013 |
| JP | 5417746 B2 | 2/2014 |

* cited by examiner

IMAGE-PROCESSING DEVICE, IMAGE-PROCESSING METHOD, AND MICROSCOPE

CROSS-REFERENCE TO RELATED APPLICATIONS

This is a continuation of International Application PCT/JP2015/068735 which is hereby incorporated by reference herein in its entirety.

TECHNICAL FIELD

The present invention relates to an image-processing device, an image-processing method, and a microscope.

BACKGROUND ART

There is a known image-processing device that is provided with a recursive noise-reduction portion and a non-recursive noise-reduction portion, wherein the recursion amount or the filter coefficient is changed in accordance with either a video-signal level and motion amount, or the gain and motion amount (for example, see Patent Literature 1).

In addition, there is a known image-processing device that is provided with a recursive noise-reduction portion and in which the recursion amount is controlled on the basis of correspondences between gains and a plurality of thresholds (for example, see Patent Literature 2).

CITATION LIST

Patent Literature

{PTL 1} Publication of Japanese Patent No. 3611773
{PTL 2} Publication of Japanese Patent No. 5417746

SUMMARY OF INVENTION

An aspect of the present invention is an image-processing device including: a pattern-matching portion that performs pattern matching between a first image and a second image acquired before the first image and that outputs a motion vector between the images and an evaluation value that indicates the accuracy of the motion vector; a recursive noise-reduction portion that outputs a noise reduction image, which is the first image to which noise reduction has been applied, and that performs noise reduction in which an image based on the first image and an image based on the noise reduction image formed in the past are mixed in accordance with a predetermined recursion amount; and a controlling portion that controls a recursion amount in the recursive noise-reduction portion on the basis of the motion vector and the evaluation value output by the pattern-matching portion and a gain that is applied to the first image to adjust a brightness thereof.

In addition, another aspect of the present invention is an image-processing method including: calculating, by performing pattern matching between a first image and a second image acquired before the first image, a motion vector between the images and an evaluation value that indicates the accuracy of the motion vector; and performing recursive noise reduction by setting, on the basis of the calculated motion vector and evaluation value, a recursion amount so as to be greater in a first region than is in a second region other than the first region, the first region being, in a coordinate plane in which the evaluation value and a motion amount that indicates a magnitude of the motion vector serve as coordinate axes thereof, a region in which the evaluation value is high and the motion amount is low and that is defined by an evaluation-value boundary that divides the evaluation value into two, that is, HIGH and LOW, levels, and a motion-amount boundary that divides the motion amount into two, that is, HIGH and LOW, levels.

BRIEF DESCRIPTION OF DRAWINGS

FIG. 3C is a diagram in which FIGS. 3A and 3B are superimposed and multiple states are plotted.

DESCRIPTION OF EMBODIMENT

An image-processing device 3 and a microscope 1 according to an embodiment of the present invention will be described below with reference to the drawings.

Figure 1:
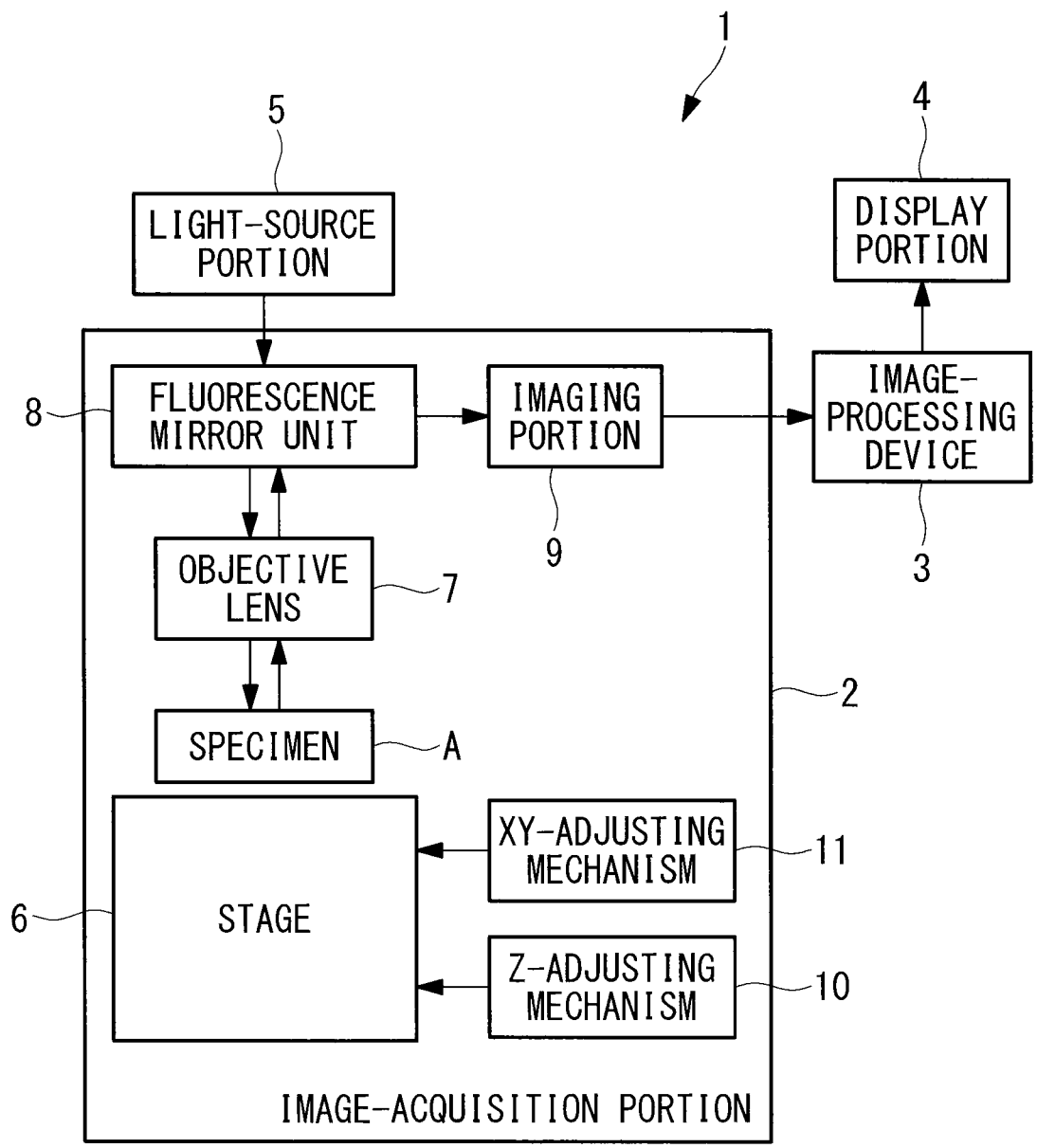
FIG. 1 is a block diagram showing a microscope according to an embodiment of the present invention.

As shown in FIG. 1, the microscope 1 according to this embodiment is, for example, a fluorescence microscope and is provided with: an image-acquisition portion 2 that acquires fluorescence images in time series; an image-processing device 3 that processes the fluorescence images acquired by the image-acquisition portion 2; and a display portion 4 that displays the fluorescence images processed by the image-processing device 3. In the figures, reference sign 5 indicates a light-source portion.

The image-acquisition portion 2 is provided with: a stage 6 on which a specimen A is placed; an objective lens 7 that radiates excitation light coming from the light-source portion 5 onto the specimen A on the stage 6 and that collects fluorescence generated in the specimen A; a fluorescence mirror unit 8 that separates the collected fluorescence from the optical path of the excitation light; and an imaging portion 9 that captures an image of the separated fluorescence.

The imaging portion 9 sequentially outputs the fluorescence images that have been acquired in time series, and also outputs gain values applied to the individual fluorescence images. In addition, the gain values are values that are multiplied by the fluorescence images acquired by the imaging portion 9 to adjust the brightness, in order to generate an appropriate image that can be more easily viewed by an observer, in accordance with the luminance.

The stage 6 is provided with: a Z-adjusting mechanism 10 that moves the specimen A in an optical-axis direction; and an XY-adjusting mechanism 11 that moves the specimen A in two directions orthogonal to the optical axis.

Figure 2:
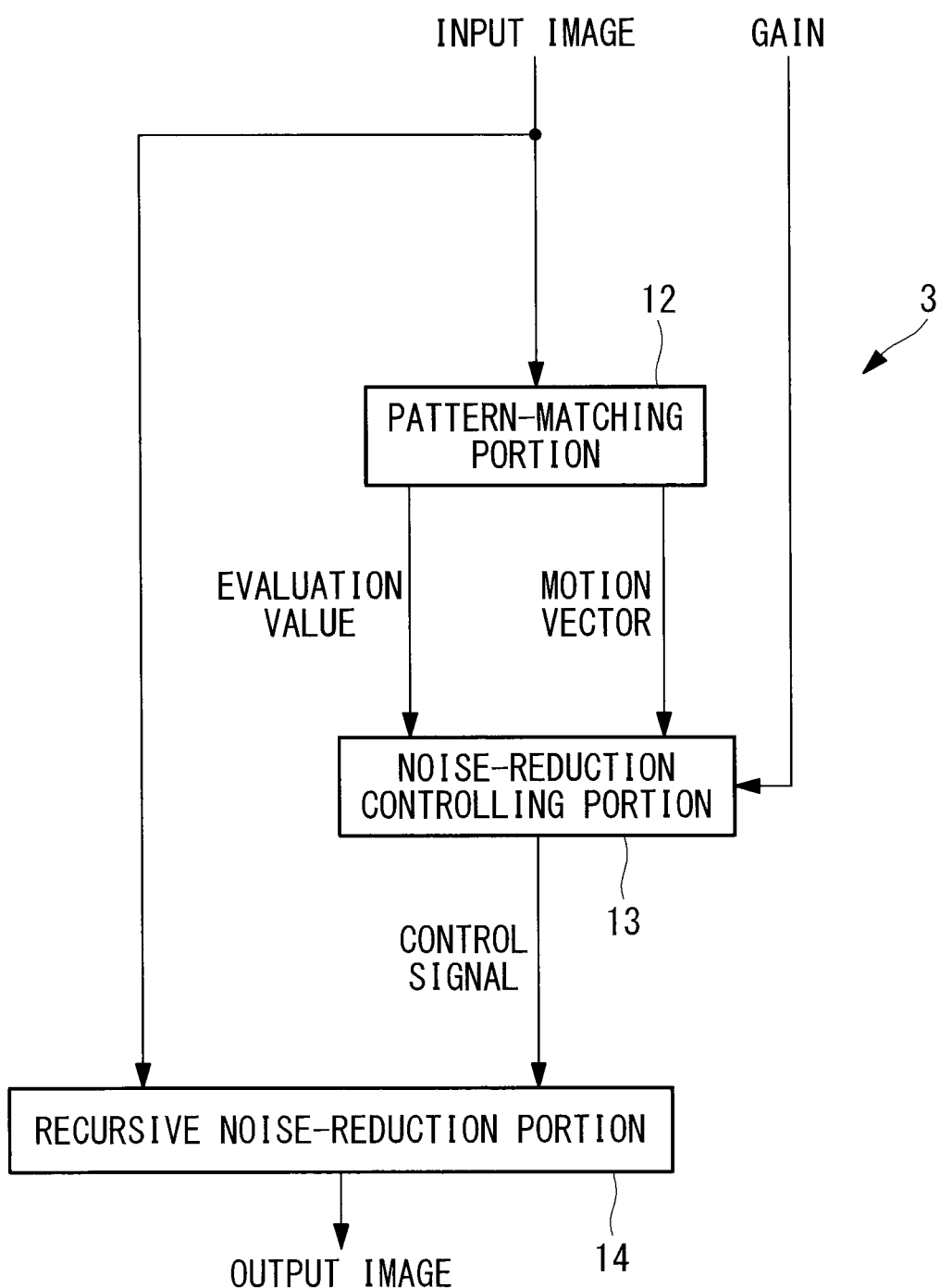
FIG. 2 is a block diagram showing an image-processing device according to an embodiment of the present invention provided in the microscope in FIG. 1.

As shown in FIG. 2, the image-processing device 3 according to this embodiment is provided with: a pattern-matching portion 12 that performs pattern matching by using a current-frame fluorescence image (first image), which is transmitted thereto from the image-acquisition portion 2, and an immediately-preceding-frame (past frame) fluorescence image (second image), which is stored in a memory (not shown), as input images; a noise-reduction controlling portion (controlling portion) 13 that generates control signals for performing noise reduction on the basis of evaluation values and motion vectors output from the pattern-matching portion 12; and a recursive noise-reduction portion 14 that applies recursive noise reduction to the current-frame image on the basis of the control signals generated by the noise-reduction controlling portion 13.

The pattern-matching portion 12 performs pattern matching in which, for example, a publically-known ZNCC (Zero-mean Normalized Cross Correlation) computation is utilized. The ZNCC computation is performed by using Eq. 1.

$$ZNCC(dx, dy) = \frac{\sum\sum [I(h, v) - \bar{I}][J(h + dx, v + dy) - \bar{J}]}{\sqrt{\sum\sum [I(h, v) - \bar{I}]^2} \sqrt{\sum\sum [J(h + dx, v + dy) - \bar{J}]^2}} \quad \{Eq. 1\}$$

where
I is the current-frame image;
$\bar{I}$ is the average current-frame image;
J is the immediately-preceding-frame image;
$\bar{J}$ is the average immediately-preceding-frame image;
(dx, dy) is a shift amount between the current-frame image and the immediately-preceding-frame image;
(h, v) is a coordinate in a ZNCC computation range; and
$\Sigma\Sigma$ is the sum of all of the values in the ZNCC computation range.

The pattern matching may be performed for the entire fluorescence image or for a portion thereof.

When the pattern matching is performed, the pattern-matching portion 12 outputs the greatest ZNCC value as an evaluation value that expresses the accuracy of a motion vector, and outputs (dx, dy) at that time as the motion vector. Although the ZNCC value is a numerical value equal to or less than 1, in the case in which the ZNCC value is negative, the evaluation value is assumed to be 0, and the evaluation value is output as a numerical value that is equal to or greater than 0 and equal to or less than 1. In this Example, although values that are equal to or less than 0 are clipped, they need not be clipped.

The noise-reduction controlling portion 13 generates signals for controlling recursion amounts of recursive noise reduction on the basis of gains input from the image-acquisition portion 2 and the evaluation values and the motion vectors input from the pattern-matching portion 12.

Figure 3A:
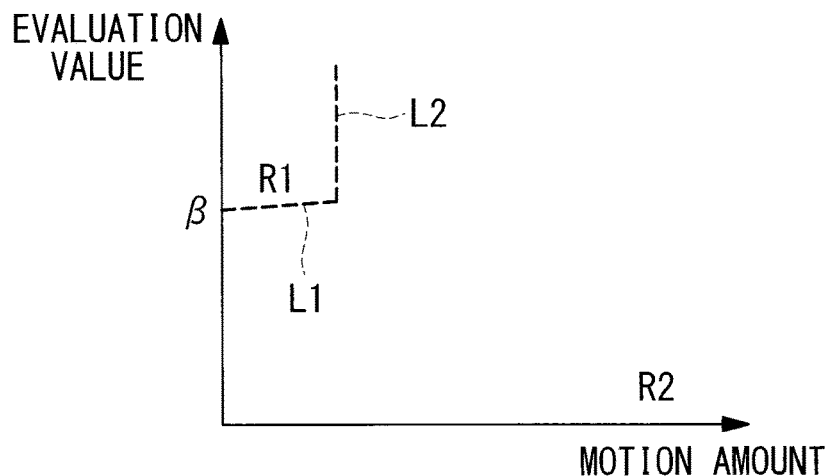
FIG. 3A is a diagram showing examples of, in the case in which the gain is 10, an evaluation-value boundary and a motion-amount boundary provided in a noise-reduction controlling portion of the image-processing device in FIG. 2.
Figure 3B:
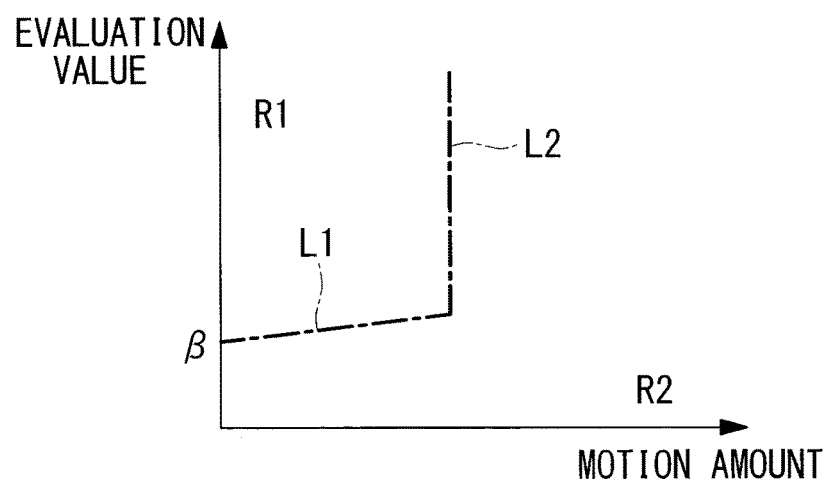
FIG. 3B is a diagram showing examples of, in the case in which the gain is 100, the evaluation-value boundary and the motion-amount boundary provided in the noise-reduction controlling portion of the image-processing device in FIG. 2.
Figure 3C:
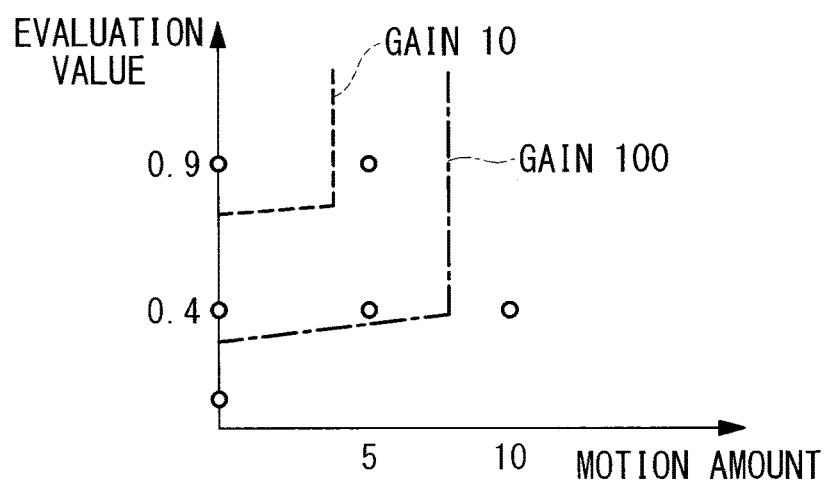

Specifically, as shown in FIGS. 3A to 3C, in a coordinate plane in which the motion amount, which indicates the magnitude of the motion vector, and the evaluation value serve as coordinate axes thereof, different recursion amounts are set in a first region R1 and a second region R2 that are divided by an evaluation-value boundary L1, which divides the evaluation value into two, that is, HIGH and LOW, levels, and a motion-amount boundary L2, which divides the motion amount into two, that is, HIGH and LOW, levels.

The motion amount is determined in the following manner by using the acquired motion vector (dx, dy);

in the case in which $|dx|>|dy|$, motion amount=$|dx|$; and in the case in which $|dx|\leq|dy|$, motion amount=$|dy|$.

In addition to the above-described form, dx+dy, $\sqrt{(dx^2+dy^2)}$, or the like may be employed as the motion amount.

FIG. 3A shows the first region R1 and the second region R2 when the gain is 10, FIG. 3B shows the first region R1 and the second region R2 when the gain is 100, and FIG. 3C is a diagram in which FIGS. 3A and 3B are superimposed.

According to FIGS. 3A and 3B, the first region R1 is a region in which the evaluation value is above the evaluation-value boundary L1 and the motion amount is below the motion-amount boundary L2, and the second region R2 is the region other than the first region R1.

In addition, as shown in FIGS. 3A to 3C, the evaluation-value boundary L1 is set in the form of a monotonically increasing linear function below (Although a linear function is used as an example in this Example, a quadratic function or the like may be used);

$y=\alpha x+\beta (\alpha \geq 0)$.

In addition, the motion-amount boundary L2 is set in the form of a constant threshold below:

$x=\gamma$.

As shown in FIG. 3C, the size of the first region R1 is set so as to increase with an increase in the gain. In other words, with an increase in the gain, the evaluation-value boundary L1 is moved in a direction such that the intercept β is decreased, and the motion-amount boundary L2 is moved in a direction such that the threshold γ is increased. In addition, the size of the region R1 may be increased by decreasing α.

Also, the noise-reduction controlling portion 13 stores, for example, the parameters α, β, and γ in accordance with the gains indicated in FIGS. 3A to 3C; when the evaluation value, the motion vector, and the gain are input, determines whether the evaluation value and the motion amount belong to the first region R1 or the second region R2 on the basis of the evaluation-value boundary L1 and the motion-amount boundary L2 selected in accordance with the gain; and outputs a control signal "0" when the evaluation value and the motion amount belong to the first region R1 and outputs a control signal "1" when the evaluation value and the motion amount belong to the second region R2. Note that Table 1 shows examples of the control signals selected on the basis of the gains, the evaluation values, and the motion amounts shown in FIG. 3C.

TABLE 1

| No. | GAIN | EVALUATION VALUE | MOTION AMOUNT | CONTROL SIGNAL |
|---|---|---|---|---|
| 1 | 10 | 0.9 | 0 | 0 |
| 2 |  | 0.4 | 0 | 1 |
| 3 | 100 | 0.4 | 0 | 0 |
| 4 |  | 0.1 | 0 | 1 |
| 5 | 10 | 0.9 | 0 | 0 |
| 6 |  | 0.9 | 5 | 1 |
| 7 | 100 | 0.4 | 5 | 0 |
| 8 |  | 0.4 | 10 | 1 |

The recursive noise-reduction portion 14 generates a recursive image (noise reduction image) by mixing the input images and past recursive images at a recursion amount in accordance with the control signal input from the noise-reduction controlling portion 13, outputs the recursive image, and also handles the output recursive image as a past recursive image.

In this embodiment, setting the control signal to "0" means that recursive noise reduction is performed at a predetermined recursion amount, and setting the control signal to "1" means that recursive noise reduction is not performed (recursion amount=0). (Note that, the recursion amount may be changed by using the control signals, for example, by assuming that the recursion amount is "HIGH" (0.8) when the control signal is set to be "0" and that the recursion amount is "LOW" (0.2) when the control signal is set to be "1").

The recursive noise-reduction portion 14 performs recursive noise reduction by using a publically-known method. In other words, the recursive image is generated; the recursive image is output after being mixed with the input images on the basis of the recursion amount in accordance with the control signal; and the recursive image is generated. Before mixing the images, positioning of the recursive image and the input images is performed.

An image-processing method performed by the thus-configured image-processing device 3 according to this embodiment will be described below.

Figure 4:
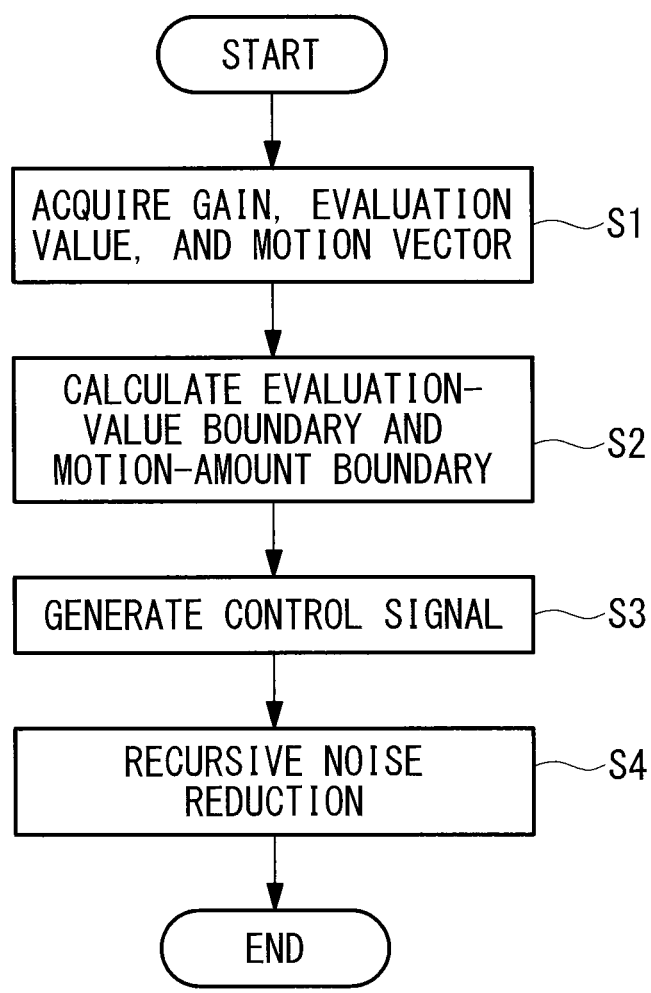
FIG. 4 is a flowchart for explaining an image-processing method performed by the image-processing device in FIG. 2.

In order to observe the specimen A by using the image-processing method according to this embodiment, as shown in FIG. 4, when the input images and the gain are input from the image-acquisition portion 2, pattern matching is performed in the pattern-matching portion 12 on the basis of the input images, and thus, the evaluation value and the motion vector are acquired (step S1).

Next, when the noise-reduction controlling portion 13 receives the evaluation value and the motion vector output from the pattern-matching portion 12 and the gain input from the image-acquisition portion 2, the evaluation-value boundary L1 and the motion-amount boundary L2 are calculated in accordance with the gain (step S2), and it is determined whether the evaluation value and the motion amount belong to the first region R1 or the second region R2, thus generating the control signal (step S3).

Then, by inputting the generated control signal to the recursive noise-reduction portion 14, the recursion amount is set in accordance with the control signal, and recursive noise reduction is performed (step S4).

As has been described above, with the image-processing device 3 and the image-processing method according to this embodiment, because, with respect to the recursion amount in the recursive noise reduction, not only the motion vector but also the evaluation value, which indicates the accuracy of the motion vector, are referred to at the same time, there is an advantage in that, even in the case in which a low-luminance imaging subject is observed, it is possible to acquire a high-visibility image by appropriately controlling the recursion amount.

In other words, when observing a low-luminance imaging subject, a high gain is applied to the image. Because the amount of noise in the image is increased in that case, it is highly likely that an error is included, making it impossible to correctly calculate the motion vector, and thus, it is difficult to correctly control the recursion amount in the recursive noise-reduction portion 14 by using only the motion vector.

With this embodiment, by using, in addition to the motion vector, the evaluation value, which indicates the accuracy thereof, it is possible to set different recursion amounts when the evaluation values are different even if the motion vectors are the same, and it is possible to set different recursion amounts when the motion vectors are different even if the evaluation values are the same. Note that, regarding a indicated in FIGS. 3A to 3C, by setting α to be α>0, it is possible to perform better control by distinguishing the motion vectors even if the evaluation values are the same.

In addition, with this embodiment, because the amount of noise is increased with an increase in the gain, there is an advantage in that it is possible to enhance visibility by increasing the size of the first region R1 and by performing noise reduction by performing positioning even in a state in which the evaluation value is low.

With the microscope 1, if the positioning for the moving specimen A by means of the XY-adjusting mechanism 11 is not performed in a state in which the accuracy of the motion vector is greater when the gain is 10, the image observation is impeded because the positioning precision is not high enough and the images are positioned at different positions. On the other hand, because the amount of noise is high when the gain is 100, a state in which the vector accuracy is low is created, and thus, it is difficult to perform the image observation unless noise reduction is applied by performing positioning even in the state in which the vector accuracy is low.

In addition, regarding focusing by means of the Z-adjusting mechanism 10, the influence of an out-of-focus state is greater when the gain is 10, and image observation is impeded unless blurriness determination is carefully performed in a state in which the motion vector accuracy is high. On the other hand, when the gain is 100, a state in which the motion vector accuracy is low is created even in a focused state, which makes it difficult to distinguish this from blurriness, and thus, it is difficult to perform image observation unless it is possible to distinguish blurriness in a state in which the accuracy is low.

With the microscope 1 according to this embodiment, because the recursion amount is controlled on the basis of the evaluation-value boundary L1 and the motion-amount boundary L2 in accordance with the gain, there is an advantage in that it is possible to enhance the ease of observation by using high-visibility images from a low gain to a high gain.

Note that, although this embodiment has been described in terms of cases in which the gains are 10 and 100, there is no limitation thereto, and, the gain may be changed to other arbitrary values, and the levels of the gain may be set to be equal to or greater than three.

Figure 5:
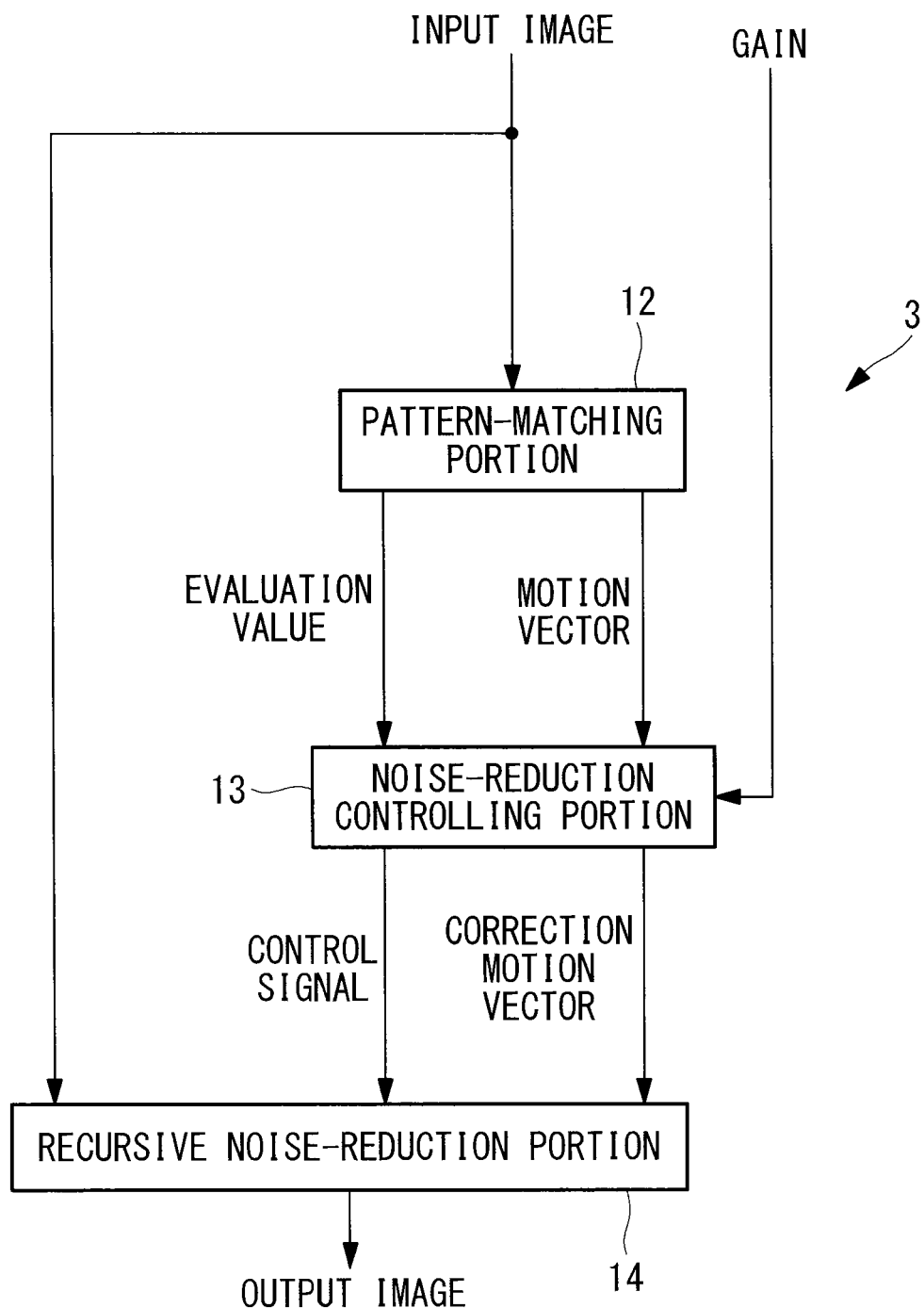
FIG. 5 is a block diagram showing a first modification of the image-processing device in FIG. 2.

In addition, in this embodiment, although the noise-reduction controlling portion 13 is assumed to output only the control signal, alternatively, as shown in FIG. 5, a correction motion vector may be output in addition to the control signal.

Figure 6:
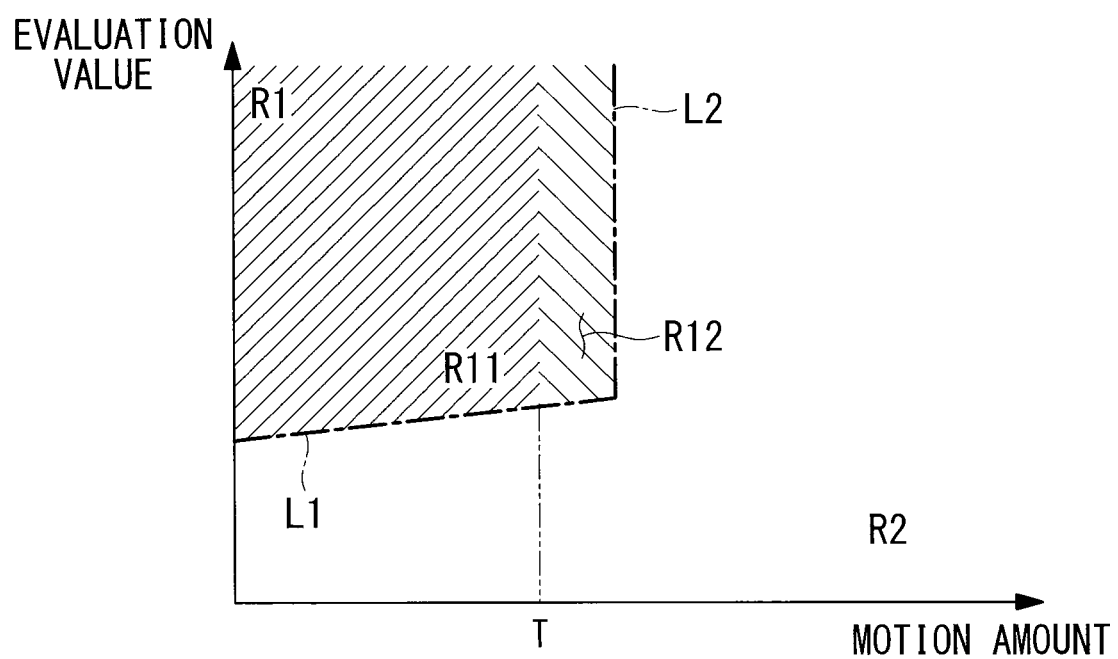
FIG. 6 is a diagram showing examples of an evaluation-value boundary and a motion-amount boundary provided in a noise-reduction controlling portion of the image-processing device in FIG. 5.

Regarding the correction motion vector, the first region R1 is further divided into two regions on the basis of a threshold T, and different values are used in the region in which the motion amount is less than the threshold T and the region in which the motion amount is equal to or greater than the threshold T. In the example shown in FIG. 6, the correction motion vector in a region R11 in which the motion amount is less than the threshold T is set to be (0, 0), and the correction motion vector in a region R12 in which the motion amount is equal to or greater than the threshold T is set to be (dx, dy).

By doing so, in positioning the images in the recursive noise-reduction portion 14, in the region R11 in which the motion amount is less than the threshold T, positioning is performed by using the correction motion vector by assuming the images are in a stationary state even if an actual motion amount exists, and, in the region R12 in which the motion amount is equal to or greater than the threshold T, positioning is performed by using the correction motion vector that is the same as the actual motion vector.

Figure 7:
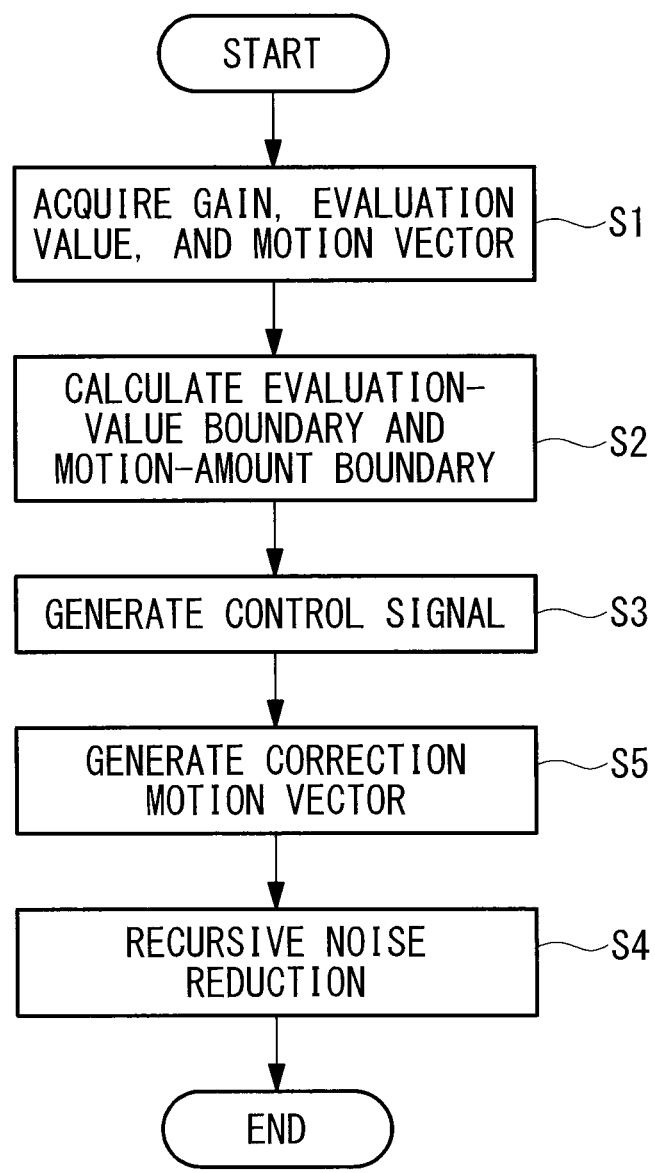
FIG. 7 is a flowchart for explaining an image-processing method performed by the image-processing device in FIG. 5.

In other words, as shown in FIG. 7, in the case in which the motion amount is determined to belong to the first region R1 on the basis of the control signal generated in step S3, the correction motion vector is generated, on the basis of the threshold, from the motion vector calculated in step S1 (step S5), and thus, recursive noise reduction in step S4 is performed.

By doing so, because errors tend to occur in the motion amount in the case of high gain and movements occur in the images even in a stationary state, by outputting the correction motion vector, a dead zone is provided and a stationary-state image is realized, and thus, stationary-state observation at a high gain is made easier.

Figure 8:
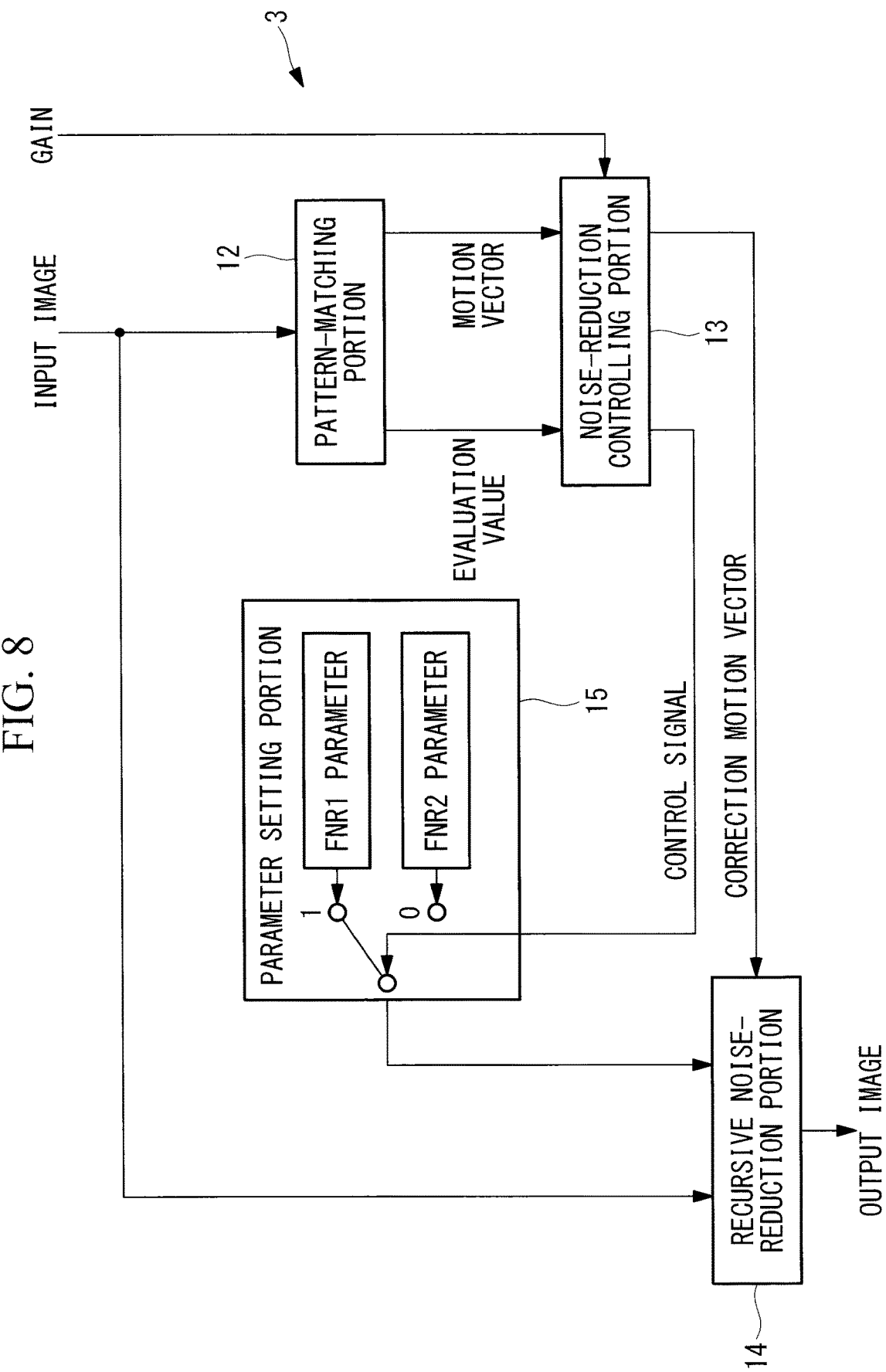
FIG. 8 is a block diagram showing a second modification of the image-processing device in FIG. 2.

In addition, in this embodiment, although switching between performing and not performing recursive noise reduction is performed in accordance with the control signal, alternatively, as shown in FIG. 8, a parameter setting portion 15 provided with a plurality of parameters (for example, recursion amount) may additionally be provided, and the parameters may be changed in accordance with the control signal. In the example shown in the figure, the parameters held in the parameter setting portion 15 are such that the recursion amount is greater in the case in which the control signal is "0" as compared with the case in which the control signal is "1". By doing so, in the case in which the control signal is "0", an image in which the recursive image accounts for an increased proportion is output, and, in the case in which the control signal is "1", an image in which the current-frame image accounts for an increased proportion is output.

Figure 9:
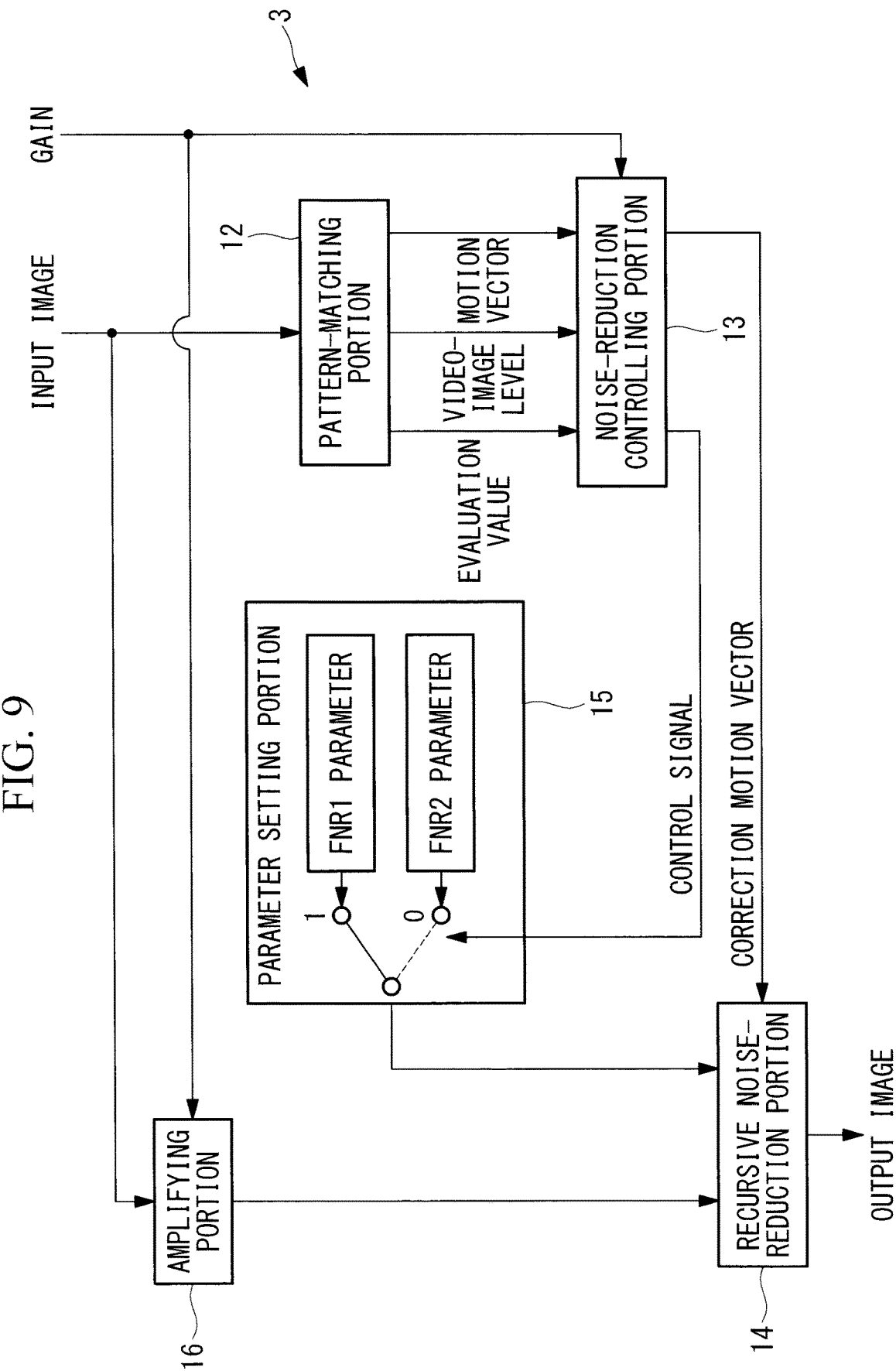
FIG. 9 is a block diagram showing a third modification of the image-processing device in FIG. 2.
Figure 10:
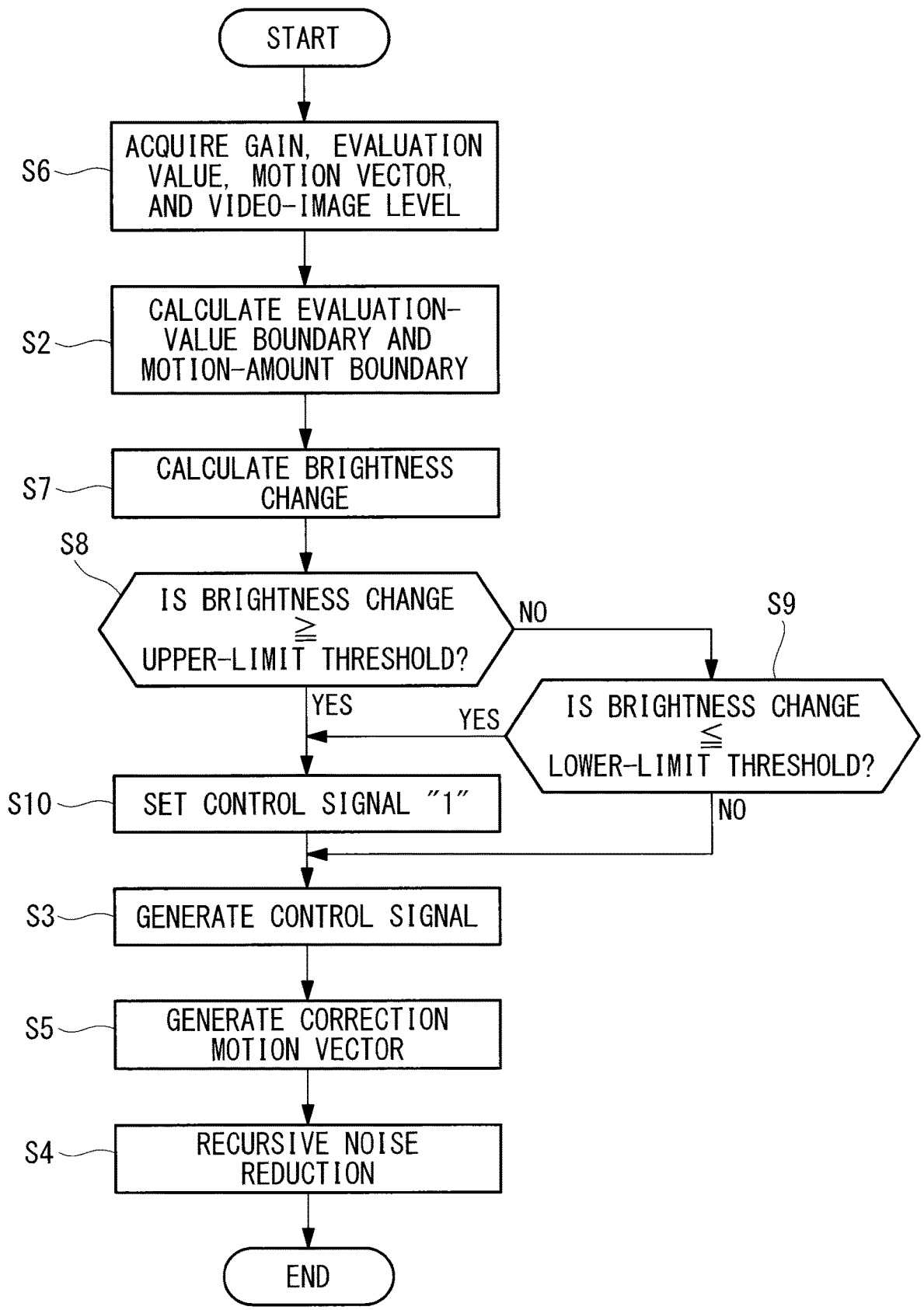
FIG. 10 is a flowchart for explaining an image-processing method performed by the image-processing device in FIG. 9.

In addition, as shown in FIGS. 9 and 10, the pattern-matching portion 12 may output the brightness information of the first image and the second image in the form of video-image levels (step S6); and the noise-reduction controlling portion 13 may calculate a brightness change between the first image and the second image (step S7), and may output the control signal for decreasing the recursion amount when the brightness change is greater than a predetermined threshold.

Specifically, the brightness change is calculated by dividing the video-image level of the first image by the video-image level of the second image.

(First-image video-image level)/(Second-image video-image level)=Brightness change When the brightness change calculated by using the above expression is equal to or greater than an upper-limit threshold or equal to or less than the lower-limit threshold (step S8, step S9), the change is determined to be an abrupt brightness change, and the control signal is set to be "1" even if the motion amount belongs to the first region R1 (step S10). By doing so, it is possible to suppress the occurrence of artifacts in the output image.

In the figures, reference sign 16 indicates an amplifying portion. The amplifying portion 16 is not necessarily required. The amplifying portion 16 may be provided only for the input images, or the amplifying portion 16 may separately be added to the flow for performing pattern matching.

Figure 11:
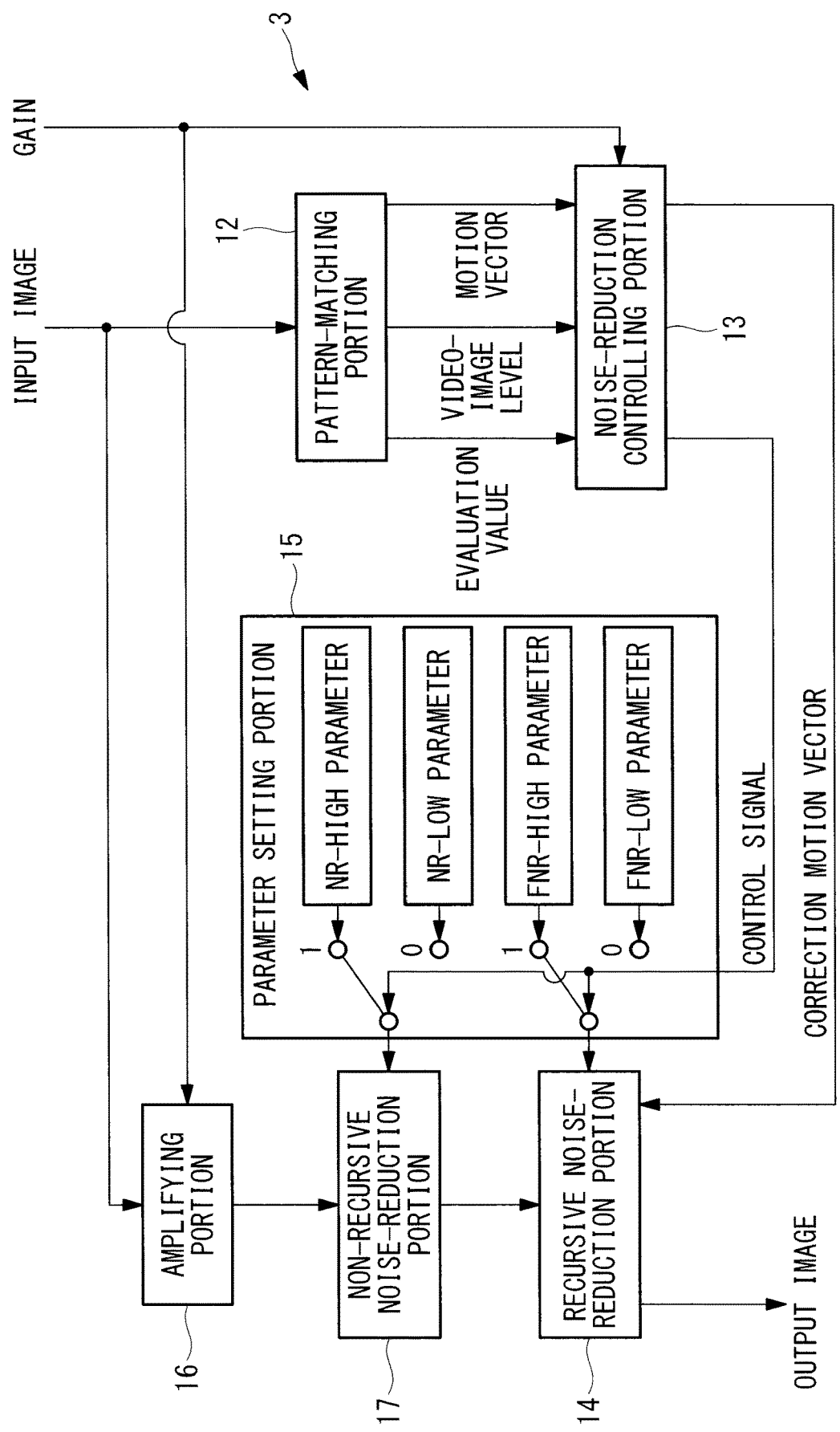
FIG. 11 is a block diagram showing a fourth modification of the image-processing device in FIG. 2.

In addition, although only the recursive noise-reduction portion 14 is provided in this embodiment, as shown in FIG. 11, a non-recursive noise-reduction portion 17 that performs noise reduction by executing interpolation, averaging, and so forth by using image data of one input image that serves as the noise-reduction target may additionally be disposed in a stage preceding the recursive noise-reduction portion 14. The parameter setting portion 15 may also hold parameters for the non-recursive noise-reduction portion 17, and the parameters may be changed in accordance with the control signal.

Specifically, in the case in which the control signal is "0", the parameters are changed so as to increase the strength of the noise reduction performed by the recursive noise-reduction portion 14 and so as to decrease the strength of the noise reduction performed by the non-recursive noise-reduction portion 17. In the case in which the recursion amount is high, because the images are close to a stationary state and it is desirable to observe the images in detail, it is possible to prevent deterioration of the sense of resolution by decreasing the strength of the non-recursive noise reduction.

On the other hand, in the case in which the control signal is "1", the parameters are changed so as to decrease the strength of the noise reduction performed by the recursive noise-reduction portion 14 (or so as to set the recursion amount to be "0") and so as to increase the strength of the noise reduction performed by the non-recursive noise-reduction portion 17. Because, in this state, the specimen A is being moved in the XY-directions in the microscope 1 or the focus is being adjusted therein, the occurrence of an after-image is decreased by decreasing the strength of the recursive noise reduction and by increasing the strength of the non-recursive noise reduction, and thus, it is possible to perform smooth manipulation.

Figure 12:
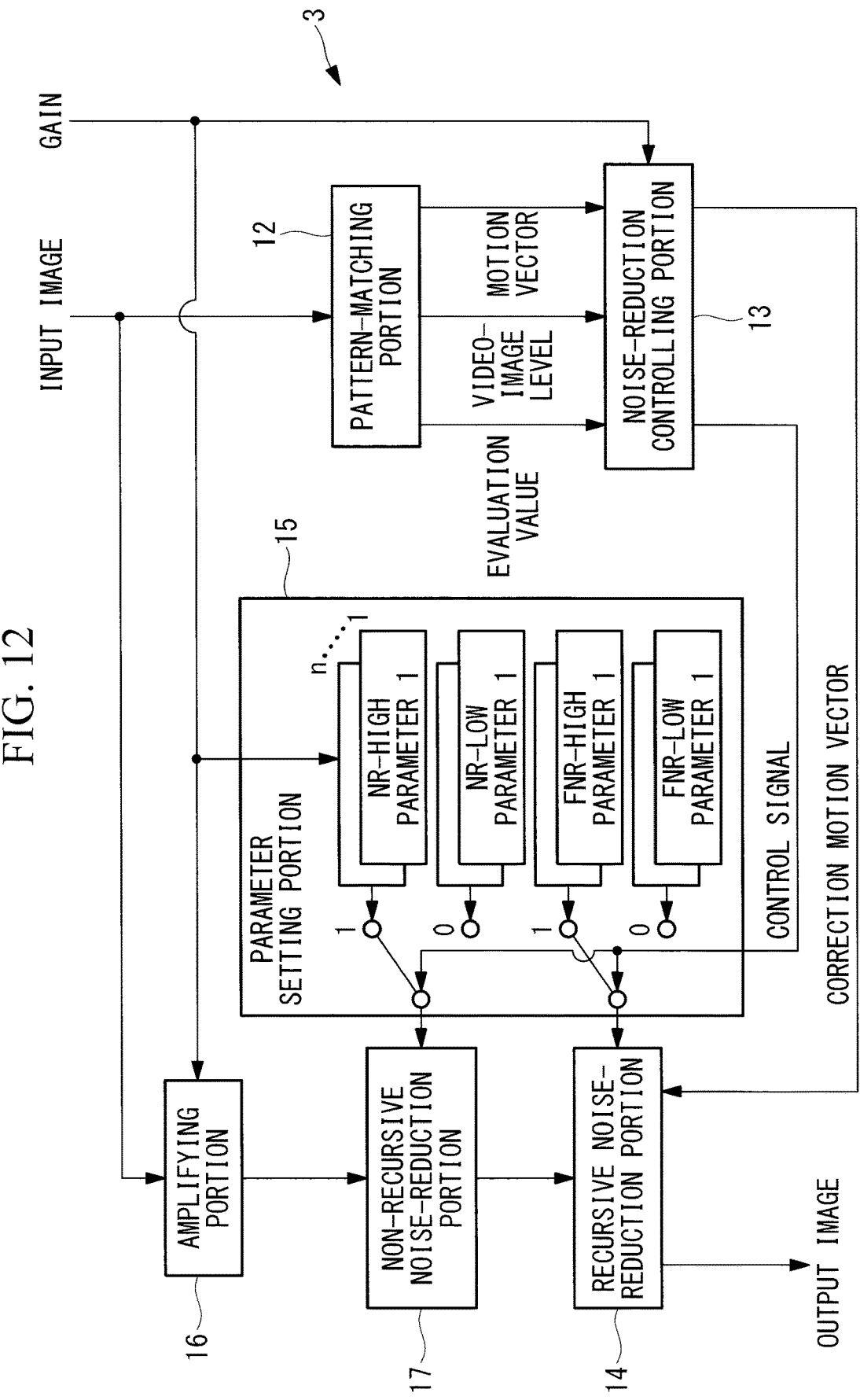
FIG. 12 is a block diagram showing a fifth modification of the image-processing device in FIG. 2.

In addition, as shown in FIG. 12, the parameters provided in the parameter setting portion 15 may be changed in accordance with the gain. In this case, gain information may be included in the control information.

Because the noise level differs in accordance with the gain, by setting a parameter with which an appropriate noise-reduction amount is achieved for each level of the gain, it is possible to achieve appropriate noise reduction at all levels of the gain.

Figure 13:
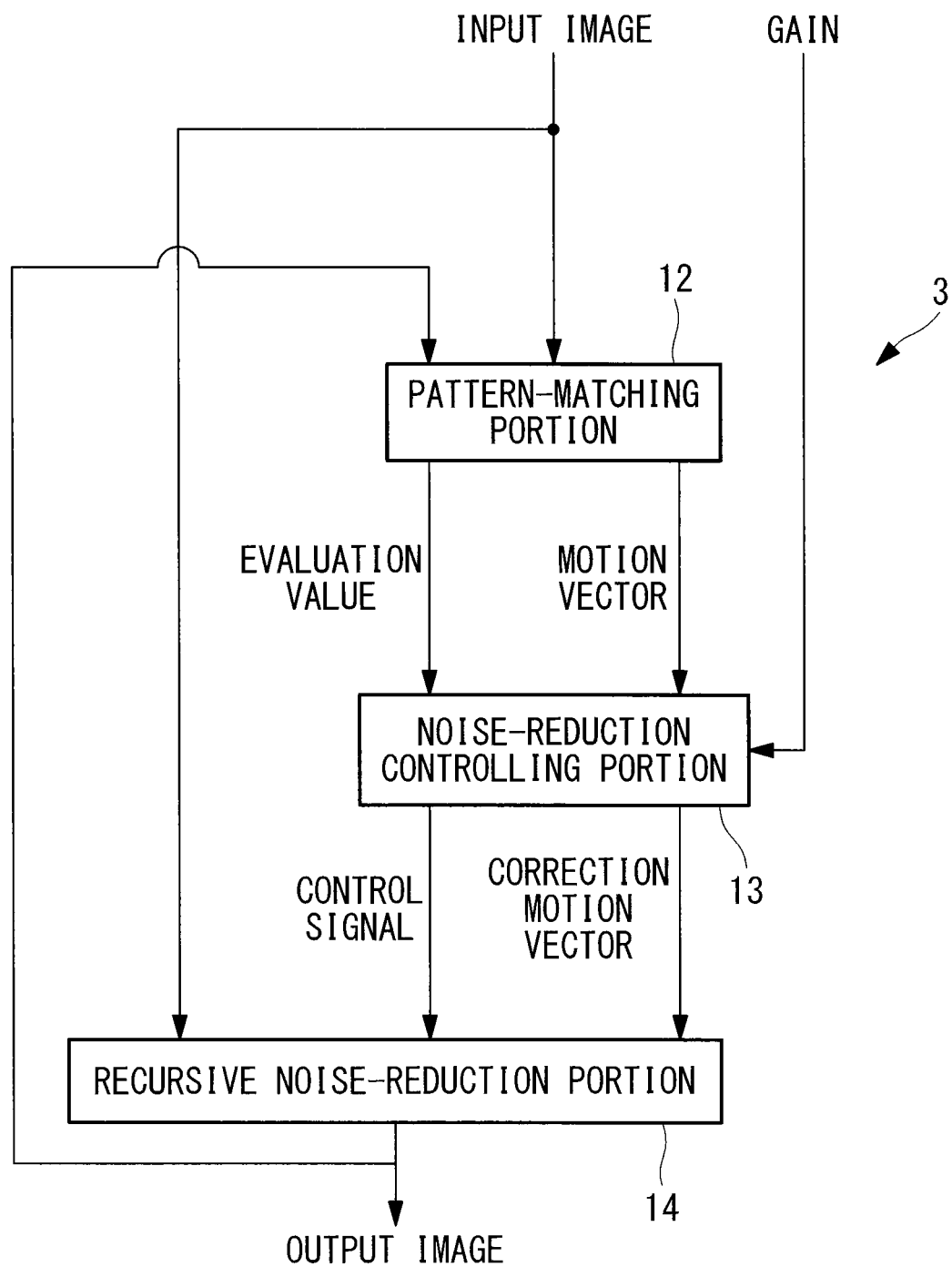
FIG. 13 is a block diagram showing a sixth modification of the image-processing device in FIG. 2.

In addition, in this embodiment, although the immediately-preceding-frame fluorescence image is employed as the past image that is delayed with respect to the input images and that is input to the pattern-matching portion 12, alternatively, as shown in FIG. 13, the past recursive image input from the recursive noise-reduction portion 14 may be employed.

In addition, in this embodiment, RAW images or color images obtained by developing the RAW images may be employed as the images to be input to the pattern-matching portion 12 or the recursive noise-reduction portion 14. In addition, RAW images may be input to the pattern-matching portion 12, and color images obtained by developing the RAW images may be input to the recursive noise-reduction portion 14.

In addition, images separately subjected to appropriate image processing may be employed as the images to be input to the pattern-matching portion 12 or the recursive noise-reduction portion 14. For example, images to which pixel-defect correction is applied may be input to the pattern-matching portion 12, and images to which pixel-defect correction and white balancing are applied may be input to the recursive noise-reduction portion 14.

The above-described embodiment leads to the following invention.

An aspect of the present invention is an image-processing device including: a pattern-matching portion that performs pattern matching between a first image and a second image acquired before the first image and that outputs a motion vector between the images and an evaluation value that indicates the accuracy of the motion vector; a recursive noise-reduction portion that outputs a noise reduction image, which is the first image to which noise reduction has been applied, and that performs noise reduction in which an image based on the first image and an image based on the noise reduction image formed in the past are mixed in accordance with a predetermined recursion amount; and a controlling portion that controls a recursion amount in the recursive noise-reduction portion on the basis of the motion vector and the evaluation value output by the pattern-matching portion and a gain that is applied to the first image to adjust a brightness thereof.

With this aspect, the first image and the second image acquired in time series are subjected to pattern matching in the pattern-matching portion, the motion vector between the images and the evaluation value indicating the accuracy thereof are output. Then, the controlling portion controls, on the basis of the motion vector and the evaluation value output from the pattern-matching portion and the gain for adjusting the brightness of the first image, the recursion amount in the recursive noise-reduction portion that performs noise reduction by mixing, in accordance with the predetermined recursion amount, the first image or the image obtained by applying image processing to the first image and the past noise reduction image or the image obtained by applying image processing to the past noise reduction image.

When observing a low-luminance imaging subject, a high gain is applied to the image. Because the amount of noise in the image is increased in that case, it is not possible to correctly calculate the motion vector, and thus, it is difficult to correctly control the recursion amount in the recursive noise-reduction portion by using only the motion vector. By using, in addition to the motion vector, the evaluation value, which indicates the accuracy thereof, it is possible to set different recursion amounts when the evaluation values are different even if the motion vectors are the same, and it is possible to set different recursion amounts when the motion vectors are different even if the evaluation values are the same. As a result, it is possible to acquire a high-visibility image by appropriately controlling the recursion amount when the gain is high.

In the above-described aspect, the controlling portion may perform control so that the recursion amount is greater in a first region than it is in a second region other than the first region, the first region being, in a coordinate plane in which the evaluation value and a motion amount that indicates a magnitude of the motion vector serve as coordinate axes thereof, a region in which the evaluation value is high and the motion amount is low and that is defined by an evaluation-value boundary that divides the evaluation value into two, that is, HIGH and LOW, levels and a motion-amount boundary that divides the motion amount into two, that is, HIGH and LOW, levels.

By doing so, an image having a good visibility is generated by increasing the recursion amount when the evaluation value and the motion amount are in the first region, and by setting the recursion amount so as to be less than that recursion amount when the evaluation value and the motion amount are in the second region.

In addition, in the above-described aspect, the evaluation-value boundary may be set so as to divide the first region and the second region at a greater value of the evaluation value with an increase in the motion amount.

Doing so expands, in the vicinity of the evaluation-value boundary, an area in which the recursion amount is increased with a decrease in the motion amount even if the evaluation value is the same. By doing so, in the case of a high gain, particularly in a stationary state, it is possible to acquire a high-visibility image.

In addition, in the above-described aspect, the controlling portion may set, with an increase in the gain, the evaluation-value boundary at a position at which the evaluation value is lower and the motion-amount boundary at a position at which the motion amount is higher.

By doing so, by expanding the first region with an increase in the gain, it is possible to expand the area in which the recursion amount is increased.

Recursive noise reduction in a smaller area in which high-precision positioning is possible is required when the gain is low because the amount of noise is low; and, on the other hand, noise reduction needs to be performed even in a state in which the accuracy of the motion vector is low when the gain is high because the amount of noise is high. The region in which the recursion amount is increased is changed in accordance with the gain, and thus, it is possible to acquire a high-visibility image over a large area from a low gain to a high gain.

In addition, in the above-described aspect, in the case in which the evaluation value and the motion amount are in the first region, the controlling portion may correct the motion vector to a zero vector when the motion amount is less than a threshold set for each level of the gain.

By doing so, by providing a dead zone in which the motion vector is set to be zero vector in a region in which the motion amount is less than the threshold, even if the motion amount is in the first region in which the recursion amount is supposed to be set to be high, it is possible to prevent movements from occurring in the image even in a stationary state when recursive noise reduction is performed due to an error in the motion amount.

In addition, in the above-described aspect, the pattern-matching portion may output brightness information of the first image and the second image, and the controlling portion may perform, on the basis of the brightness information output from the pattern-matching portion, control so as to decrease the recursion amount in the case in which a brightness change between the first image and the second image is greater than a predetermined threshold.

By doing so, in the case in which the brightness change between the first image and the second image is abrupt, it is possible to prevent the occurrence of an artifact in recursive noise reduction by performing control so as to decrease the recursion amount.

In addition, in the above-described aspect, a non-recursive noise-reduction portion that performs noise reduction by using one image of the first image may be provided, and the controlling portion may perform control so that the strength of the noise reduction performed by the recursive noise-reduction portion becomes greater than that of the noise reduction performed by the non-recursive noise-reduction portion when the evaluation value and the motion amount are in the first region, and so that the strength of the noise reduction performed by the non-recursive noise-reduction portion becomes greater than that of the noise reduction performed by the recursive noise-reduction portion when the evaluation value and the motion amount are in the second region.

By doing so, it is possible to suppress noise by means of non-recursive noise reduction even in the second region in which the recursion amount is not increased. It is possible to improve the image visibility in a state in which movement is particularly large.

In addition, in the above-described aspect, the controlling portion may perform control so as to increase, with an increase in the gain, strengths of the noise reduction performed by the recursive noise-reduction portion and the non-recursive noise-reduction portion.

By doing so, it is possible to ensure a high enough image quality having a good noise level at which image deterioration due to afterimage is low regardless of the gain.

In addition, in the above-described aspect, the second image may be the noise reduction image.

In addition, in the above-described aspect, the second image may be a past-frame image acquired before the first image.

In addition, another aspect of the present invention is an image-processing method including: calculating, by performing pattern matching between a first image and a second image acquired before the first image, a motion vector between the images and an evaluation value that indicates the accuracy of the motion vector; and performing recursive noise reduction by setting, on the basis of the calculated motion vector and evaluation value, a recursion amount so as to be greater in a first region than is in a second region other than the first region, the first region being, in a coordinate plane in which the evaluation value and a motion amount that indicates a magnitude of the motion vector serve as coordinate axes thereof, a region in which the evaluation value is high and the motion amount is low and that is defined by an evaluation-value boundary that divides the evaluation value into two, that is, HIGH and LOW, levels, and a motion-amount boundary that divides the motion amount into two, that is, HIGH and LOW, levels.

The above-described aspect may include setting the evaluation-value boundary so as to divide the first region and the second region at a greater value of the evaluation value with an increase in the motion amount.

In addition, the above-described aspect may include setting, with an increase in a gain, the evaluation-value boundary at a position at which the evaluation value is lower and the motion-amount boundary at a position at which the motion amount is higher.

In addition, the above-described aspect may include correcting, in the case in which the evaluation value and the motion amount are in the first region, the motion vector to a zero vector when the motion amount is less than a threshold set for each level of the gain.

In addition, the above-described aspect may include detecting a brightness change between the first image and the second image, and performing control so as to decrease the recursion amount when the detected brightness change is greater than a predetermined threshold.

In addition, the above-described aspect may include performing control so that the strength of recursive noise reduction becomes greater than that of non-recursive noise reduction when the evaluation value and the motion amount are in the first region, and so that the strength of the non-recursive noise reduction becomes greater than that of the recursive noise reduction when the evaluation value and the motion amount are in the second region.

In addition, in the above-described aspect, control may be performed so as to increase strengths of the recursive noise reduction and the non-recursive noise reduction with an increase in the gain.

In addition, another aspect of the present invention is a microscope including: an image-acquisition portion that acquires a first image and a second image in time series and any one of the above-described image-processing devices.

REFERENCE SIGNS LIST 1 microscope
2 image-acquisition portion
3 image-processing device
12 pattern-matching portion
13 noise-reduction controlling portion (controlling portion)
14 recursive noise-reduction portion
17 non-recursive noise-reduction portion
A specimen
L1 evaluation-value boundary
L2 motion-amount boundary
R1 first region
R2 second region

The invention claimed is:

1. An image-processing device comprising:
a pattern-matching portion that performs pattern matching between a first image and a second image acquired before the first image and that outputs a motion vector between the images and an evaluation value that indicates the accuracy of the motion vector;
a recursive noise-reduction portion that outputs a noise reduction image, which is the first image to which noise reduction has been applied, and that performs noise reduction in which an image based on the first image and an image based on the previously formed noise reduction image are mixed in accordance with a predetermined recursion amount; and
a controlling portion that controls a recursion amount in the recursive noise-reduction portion on the basis of the motion vector and the evaluation value output by the pattern-matching portion and a gain that is applied to the first image to adjust a brightness thereof;
wherein the controlling portion performs control so that the recursion amount is greater in a first region than it is in a second region other than the first region, the first region being, in a coordinate plane in which the evaluation value and a motion amount that indicates a magnitude of the motion vector serve as coordinate axes thereof, a region in which the evaluation value is high and the motion amount is low and that is defined by an evaluation-value boundary that divides the evaluation value into two, that is, HIGH and LOW, levels and a motion-amount boundary that divides the motion amount into two, that is, HIGH and LOW, levels.

2. An image-processing device according to claim 1, wherein the evaluation-value boundary is set so as to divide the first region and the second region at a greater value of the evaluation value with an increase in the motion amount.

3. An image-processing device according to claim 1, wherein the controlling portion sets, with an increase in the gain, the evaluation-value boundary at a position at which the evaluation value is lower and the motion-amount boundary at a position at which the motion amount is higher.

4. An image-processing device according to claim 3, wherein, in the case in which the evaluation value and the motion amount are in the first region, the controlling portion corrects the motion vector to a zero vector when the motion amount is less than a threshold set for each level of the gain.

5. An image-processing device according to claim 1, wherein the pattern-matching portion outputs brightness information of the first image and the second image, and the controlling portion performs, on the basis of the brightness information output from the pattern-matching portion, control so as to decrease the recursion amount in the case in which a brightness change between the first image and the second image is greater than a predetermined threshold.

6. An image-processing device according to claim 1, further comprising:

a non-recursive noise-reduction portion that performs noise reduction by using one image of the first image, wherein the controlling portion performs control so that the strength of the noise reduction performed by the recursive noise-reduction portion becomes greater than that of the noise reduction performed by the non-recursive noise-reduction portion when the evaluation value and the motion amount are in the first region, and so that the strength of the noise reduction performed by the non-recursive noise-reduction portion becomes greater than that of the noise reduction performed by the recursive noise-reduction portion when the evaluation value and the motion amount are in the second region.

7. An image-processing device according to claim 6, wherein the controlling portion performs control so as to increase, with an increase in the gain, strengths of the noise reduction performed by the recursive noise-reduction portion and the non-recursive noise-reduction portion.

8. An image-processing device according to claim 1, wherein the second image is the noise reduction image.

9. An image-processing method comprising:

calculating, by performing pattern matching between a first image and a second image acquired before the first image, a motion vector between the images and an evaluation value that indicates the accuracy of the motion vector; and performing recursive noise reduction on the first image by setting, on the basis of the calculated motion vector and evaluation value, a recursion amount so as to be greater in a first region than is in a second region other than the first region, the first region being, in a coordinate plane in which the evaluation value and a motion amount that indicates a magnitude of the motion vector serve as coordinate axes thereof, a region in which the evaluation value is high and the motion amount is low and that is defined by an evaluation-value boundary that divides the evaluation value into two, that is, HIGH and LOW, levels, and a motion-amount boundary that divides the motion amount into two, that is, HIGH and LOW, levels.

10. An image-processing method according to claim 9, further comprising:

setting the evaluation-value boundary so as to divide the first region and the second region at a greater value of the evaluation value with an increase in the motion amount.

11. An image-processing method according to claim 9, further comprising:

setting, with an increase in a gain, the evaluation-value boundary at a position at which the evaluation value is lower and the motion-amount boundary at a position at which the motion amount is higher.

12. An image-processing method according to claim 11, further comprising:

correcting, in the case in which the evaluation value and the motion amount are in the first region, the motion vector to a zero vector when the motion amount is less than a threshold set for each level of the gain.

13. An image-processing method according to claim 9, further comprising:

detecting a brightness change between the first image and the second image; and performing control so as to decrease the recursion amount when the detected brightness change is greater than a predetermined threshold.

14. An image-processing method according to claim 9, further comprising:

performing control so that the strength of recursive noise reduction becomes greater than that of non-recursive noise reduction when the evaluation value and the motion amount are in the first region, and so that the strength of the non-recursive noise reduction becomes greater than that of the recursive noise reduction when the evaluation value and the motion amount are in the second region.

15. An image-processing method according to claim 14, wherein control is performed so as to increase strengths of the recursive noise reduction and the non-recursive noise reduction with an increase in the gain.

16. A microscope comprising:

an image-acquisition portion that acquires a first image and a second image in time series; and an image-processing device according to claim 1.

17. An image-processing device comprising:

a processor comprising hardware, the processor configured to:

perform pattern matching between a first image and a second image acquired before the first image and output a motion vector between the images and an evaluation value that indicates the accuracy of the motion vector;

output a noise reduction image, which is the first image to which noise reduction has been applied, and perform noise reduction in which an image based on the first image and an image based on the previously formed noise reduction image are mixed in accordance with a predetermined recursion amount; and control a recursion amount in the noise reduction on the basis of the output motion vector and the output evaluation value and a gain that is applied to the first image to adjust a brightness thereof;

wherein the processor is further configured to perform control so that the recursion amount is greater in a first region than it is in a second region other than the first region, the first region being, in a coordinate plane in which the evaluation value and a motion amount that indicates a magnitude of the motion vector serve as coordinate axes thereof, a region in which the evaluation value is high and the motion amount is low and that is defined by an evaluation-value boundary that divides the evaluation value into two, that is, HIGH and LOW, levels and a motion-amount boundary that divides the motion amount into two, that is, HIGH and LOW, levels.

* * * * *